May 15, 1928. 1,670,195

F. J. M. GERLAND

HIGH LIGHT PROCESS OF PHOTOENGRAVING

Filed June 26, 1926

Original Drawing.

Positive from Line Negative

Retouched Positive from Line Negative

Positive from Superimposed Negatives

Witnesses
F. N. Taylor
Harry P. Seidel

INVENTOR
F. J. M. Gerland
BY
Munn & Co.
ATTORNEY

Patented May 15, 1928.

1,670,195

UNITED STATES PATENT OFFICE.

FREDERICK JOHN MATTHEW GERLAND, OF NEW YORK, N. Y., ASSIGNOR TO WALKER ENGRAVING CO., A COPARTNERSHIP COMPOSED OF EDWARD EPSTEAN, CLARENCE EPSTEAN, AND HENRY L. WALKER, OF NEW YORK, N. Y.

HIGH-LIGHT PROCESS FOR PHOTO-ENGRAVING.

Application filed June 26, 1926. Serial No. 118,829.

This invention relates to a high light process of photo-engraving, an object of the invention being to reproduce all of the delicate detail in the high lights of a picture.

More specifically my invention is an improvement upon the process disclosed in Patent 506,109, granted to me October 3, 1893.

Figure 1:
Figure 2:
Figure 3:
Figure 4:
Figure 5:

Figure 1 discloses how the original drawing would appear from which the photographs are to be made, Figure 2 shows a positive from a light negative made from the original drawing, Figure 3 shows the same view with the shadows retouched, Figure 4 shows a positive formed from superimposed negative made from Figs. 2 and 3, Figure 5 is a longitudinal vertical section of a transparent plate upon which are mounted the super-imposed negatives.

In carrying out this patented process, I first make a negative from wash, crayon or pencil drawings in the regular established way with a screen. I then make a plain negative in the same focus without a screen, so exposed as to give little or no detail in the blacks or middle tones, keeping the fine lines in the lights as clear as possible. I then superimpose the half-tone negative over the line or plain negative which automatically eliminates the screen in the highest lights; or, if desired, a high light negative can be made by first exposing the picture with a screen, giving it a full and regular exposure. Then, before taking out of the camera, I expose the picture again on the same film without a screen, which produces somewhat the same result as the foregoing.

This method or process has certain disadvantages which I overcome by my improved process. By the old process considerable handwork is necessary and is both expensive and slow. Furthermore, by the old process it was impossible to keep the delicate detail running out into the high lights. My invention therefore consists in certain novel steps in the process, all of which will be hereinafter described and pointed out in the claims.

The first step of my new process may be like the old, that is, I make a first line or plain negative without the screen. I then make a photo-print from the plain negative and strengthen the delicate lines which appear faintly in the print, and from this strengthened print I make another negative of exactly the same size. This produces a negative which is prefectly clear in the strengthened and other areas.

I also make a half tone negative with a screen, and on this half tone negative I superimpose the negative from the print which has the strengthened lines. This superimposing of one negative upon the other is commonly known in the trade as stripping one negative over the other, and from this double negative pictures may be printed which bring out every line or detail with perfect clearness, so that the subsequent printing, etching and finishing to be done can be accomplished without difficulty and with the result that all of the delicate details of the picture are reproduced giving superior quality and at less expense than by any process heretofore known.

The important step of the process as distinguished from the process of my prior patent is, therefore, the making of a print from the plain negative and strengthening the delicate lines which appear faintly on the print, and the making of another negative from this print, this last named negative being superimposed upon the half tone negative and utilized with the latter for printing or other analogous uses.

In order to obtain the final picture it is necessary to mount on a transparent member 10, a negative 12 made from the original drawing shown in Fig. 1 and from which the positive is made as shown in Fig. 2. The second negative made from the retouched positive in Fig. 3 is applied to the negative 12. The printing of the two superimposed negatives is disclosed by the positive in Fig. 4.

While I have set forth what I believe to be a preferable series of steps in the carrying out of my improved process, I would have it understood that the same is capable of slight modification without departing from the spirit and scope of the appended claims.

I claim:

1. The herein described high light process of photo-engraving, comprising the making of a half tone negative, the making of a plain negative, then making a print from the plain negative, retouching the print, making a negative from the print, superimposing this negative upon the half tone, and printing directly from the superimposed negatives.

2. The herein described high light process of photo-engraving, comprising the making of half tone and plain negatives from the same subject, then making a print from the plain negative, then strengthening the lines of the print, then making a negative from said print, then superimposing the last mentioned negative upon the half tone negative, and then printing directly from the superimposed negatives.

FREDERICK JOHN MATTHEW GERLAND.